United States Patent [19]
Kohus et al.

[11] Patent Number: 4,856,809
[45] Date of Patent: Aug. 15, 1989

[54] COLLAPSIBLE STROLLER WITH STOWABLE TRAY

[75] Inventors: Louis M. Kohus; John V. Mariol, both of Cincinnati, Ohio; David Saint, Elverson, Pa.

[73] Assignee: Graco Metal Products Inc., Elverson, Pa.

[21] Appl. No.: 211,322

[22] Filed: Jun. 24, 1988

Related U.S. Application Data

[63] Continuation of Ser. No. 928,079, Nov. 7, 1986, abandoned.

[51] Int. Cl.$^4$ ............................. B62B 7/08; B62B 9/12
[52] U.S. Cl. ..................................... 280/644; 280/650; 280/658; 280/47.38; 297/155; 297/162; 108/44
[58] Field of Search ................... 280/47, 38, 642, 643, 280/644, 650, 658; 297/155, 162, 487, DIG. 4; 108/44; 24/615, 616, 617

[56] References Cited

U.S. PATENT DOCUMENTS

| | | | |
|---|---|---|---|
| 137,738 | 4/1873 | Trevitt | 297/192 |
| 254,023 | 2/1882 | Kenna | 297/155 |
| 365,523 | 6/1887 | Kenna | 297/DIG. 4 X |
| 451,058 | 4/1891 | Koeser | 297/155 |
| 1,355,039 | 10/1920 | Gibson | 297/192 |
| 2,468,683 | 4/1949 | Michal | 16/133 |
| 2,643,898 | 6/1953 | Everest et al. | 280/242 WC |
| 2,976,912 | 3/1961 | Dias | 280/658 |
| 3,212,814 | 10/1965 | Anderson | 297/155 |
| 3,575,466 | 4/1971 | Thomas et al. | 297/155 |
| 3,632,163 | 1/1972 | Burnham | 297/155 |
| 3,881,739 | 5/1975 | Laune | 280/42 |
| 3,967,342 | 7/1976 | Gebhard | 16/48 |
| 3,989,295 | 11/1976 | Sparkes | 297/45 |
| 3,999,798 | 12/1976 | Roulier | 297/DIG. 4 X |
| 4,030,769 | 6/1977 | Peng et al. | 280/42 |
| 4,620,711 | 11/1986 | Dick | 280/643 X |
| 4,639,982 | 2/1987 | Kasai | 24/616 |
| 4,643,445 | 2/1987 | Cabagnero | 280/644 |
| 4,645,370 | 2/1987 | Kassai | 280/644 |

FOREIGN PATENT DOCUMENTS 1020412 2/1953 France ................................. 280/36

OTHER PUBLICATIONS

Aprica Catalog, copyright 1984.
Graco 1985 Product Catalog, pp. 22-25.

*Primary Examiner*—Charles A. Marmor
*Assistant Examiner*—Brian L. Johnson
*Attorney, Agent, or Firm*—Panitch, Schwarze, Jacobs & Nadel

[57] ABSTRACT

The present invention is directed to a collapsible stroller with a stowable tray. The tray mechanism is associated with the stroller. The tray mechanism includes a tray portion, a swivel mechanism located at one end of the tray portion, and a latching mechanism located at an opposite end of said tray portion. The swivel includes a sleeve which engages a member of the stroller and is adapted to allow the sleeve to rotate about the member. A pin is affixed to the tray portion and is perpendicular to the member of the stroller. The tray portion engages the pin and is adapted to rotate with the pin.

5 Claims, 3 Drawing Sheets

COLLAPSIBLE STROLLER WITH STOWABLE TRAY

This is a continuation of co-pending application Ser. No. 928,079 filed on Nov. 7, 1986, now abandoned.

SCOPE OF THE INVENTION

The present invention is directed to a collapsible stroller with a stowable tray.

BACKGROUND OF THE INVENTION

Heretofore, collapsible strollers have been known and sold throughout the U.S. But, the inventors of the present invention are unaware of any collapsible stroller having a stowable tray. The stowable tray of the present invention provides a number of advantages. The tray provides a playing surface for the child. The tray can be used to hold such items as food, toys, utensiles, etc. The tray can be stowed in a position out of the way of both parent and child. The stowed position is to the side of the seat. When the stroller is collapsed, the tray is folded into the stroller and does not adversely effect the compactness of the stroller.

The tray latch mechanism provides a child-proof, double-action latch mechanism which secures the tray in its "in use" position.

SUMMARY OF THE INVENTION

The present invention is directed to a collapsible stroller with a stowable tray. The tray mechanism is associated with the stroller. The tray mechanism includes a tray portion, a swivel mechanism located at one end of the tray position, and a latching mechanism located at an opposite end of said tray portion. The swivel mechanism includes a sleeve which engages a member of the stroller and is adapted to allow the sleeve to rotate about the member. A pin is affixed to the tray portion and is perpendicular to the member of the stroller. The tray portion engages the pin and is adapted to rotate with the pin.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
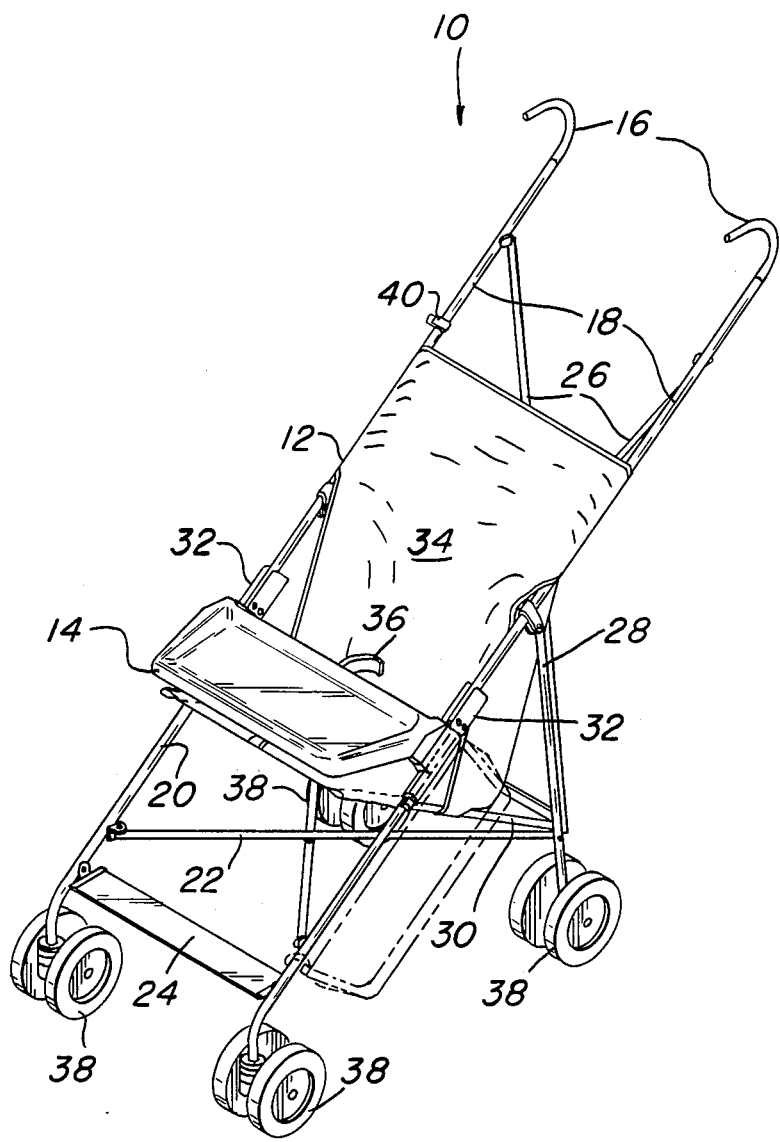
FIG. 1 is an isometric view of a preferred embodiment of the present invention illustrated in its "in use" position, a tray being shown in phantom at its stowed position.

Referring to the drawings wherein like numerals represent like elements, there is shown in FIG. 1 a preferred embodiment of the present invention generally denoted 10.

The collapsible stroller with stowable tray 10 comprises a stroller body 12 and a tray member 14.

Figure 2:
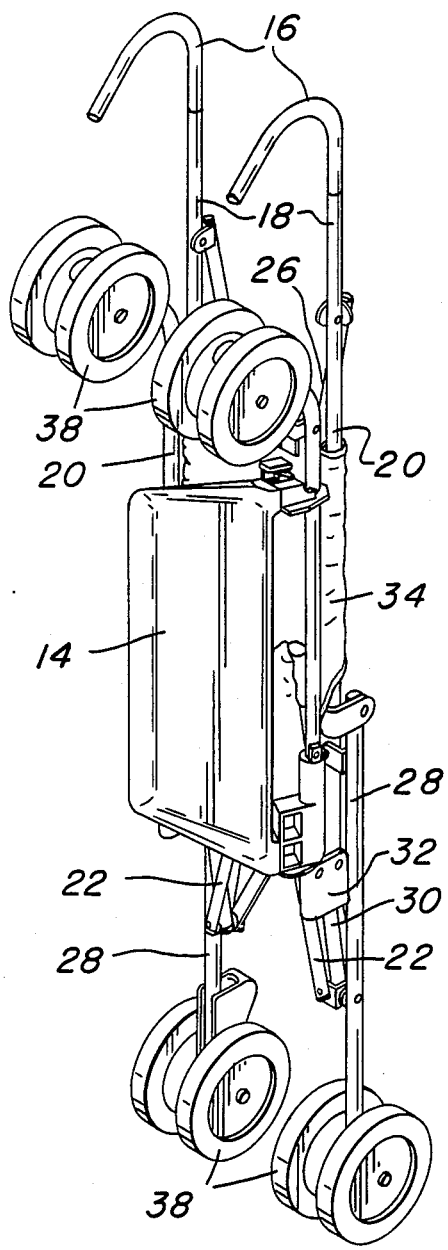
FIG. 2 is an isometric view of a preferred embodiment of the present invention, the embodiment being in its compacted position.

Stroller body 12 is laterally collapsible and may be folded in half once collapsed. See FIG. 2. The stroller 10, in its compact shape, allows easy storage and handling when not in use. The tray member 14 is folded into the stroller body 12 (FIG. 2) and does not increase the volume of the collapsed stroller.

Stroller 12 includes a pair of upper members 18 and lower members 20. Each upper member 18 and lower member 20 is joined together by a hinge 32. When the stroller 12 is in its "in use" position (see FIG. 1), upper and lower members 18, 20 combine to define lateral diagonal brace members.

A generally vertical brace 28 pivotally depends from each upper member 18. A vertical scissor member 26 joins the uppermost portions of upper members 18 and the lowermost portion of vertical braces 28. Scissor member 26 is pivotally joined to members 18 and braces 28. A horizontal scissor member 22 joins the lowermost portions of lower members 20 and the lowermost portions of vertical braces 28. Scissor member 22 is pivotally joined to members 20 and braces 28. The pivotal junction of scissor member 26 and scissor member 22 with braces 28 is juxtaposed on braces 28. A cross member 30 is pivotally joined to the lowermost portion of vertical brace 28 and the uppermost portions of lower members 20. The pivotal junction of brace 28 and member 30 is juxtaposed to the junction of scissor members 22, 26 and brace 28. The terminal ends of lower members 20 and vertical braces 28 hold castors 38. Castors 38 are freely pivotable on their respective terminal end portions.

A footrest 24 is affixed between the lowermost portions of lower members 20 and proximal the casters 38. Footrest 24 is laterally collapsible.

A seat portion 34 is placed between and affixed to upper members 18 and the uppermost ends of braces 30. Seat portion 34 is preferably made of a flexible fabric material.

A seat belt 36 is affixed to seat 34. Seat belt 36 is provided to keep the child within the stroller and on the seat 34. The seat belt is used when the tray 14 is either in its "in use" or "stowed" (see phantom tray in FIG. 1) positions.

A clasp 40 is located on an upper member 18 of the stroller body 12. Clasp 40 engages the corresponding lower member 20 and thereby secures the stroller in its collapsed and folded position (see FIG. 2).

A tray swivel 42 is operatively connected to the upper end portion of a lower member 20. Tray swivel 42 is adapted for rotational movement about the longitudinal axis of member 20. See Arrow A in FIG. 3. Tray 14 is adapted for rotational movement about an axis which is coaxial with a hole 48. See Arrow B in FIG. 3. Preferably, a bolt 49 extends through hole 48 and engages tray 14. Additionally, tray 14 is preferably provided with an annular boss (not shown) having an external diameter slightly less than the diameter of hole 48. The height of the boss (not shown) is preferably slightly greater than the depth of hole 48. Bolt 49 is perpendicular to the longitudinal axis of member 20 and is affixed to tray 14. Swivel 42 includes a sleeve portion 64 which allows swivel 42 to rotate about lower member 20. Bolt 49 is a hinge pin type device. A stop 72 prevents swivel 42 from sliding along the longitudinal axis of member 20.

Figure 5:
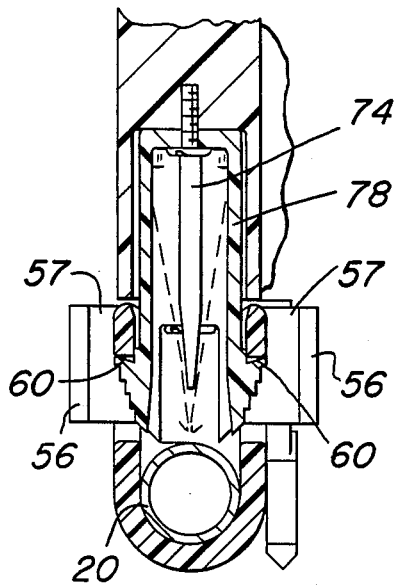
FIG. 5 is a cross-sectional view of the latch mechanism.
Figure 3:
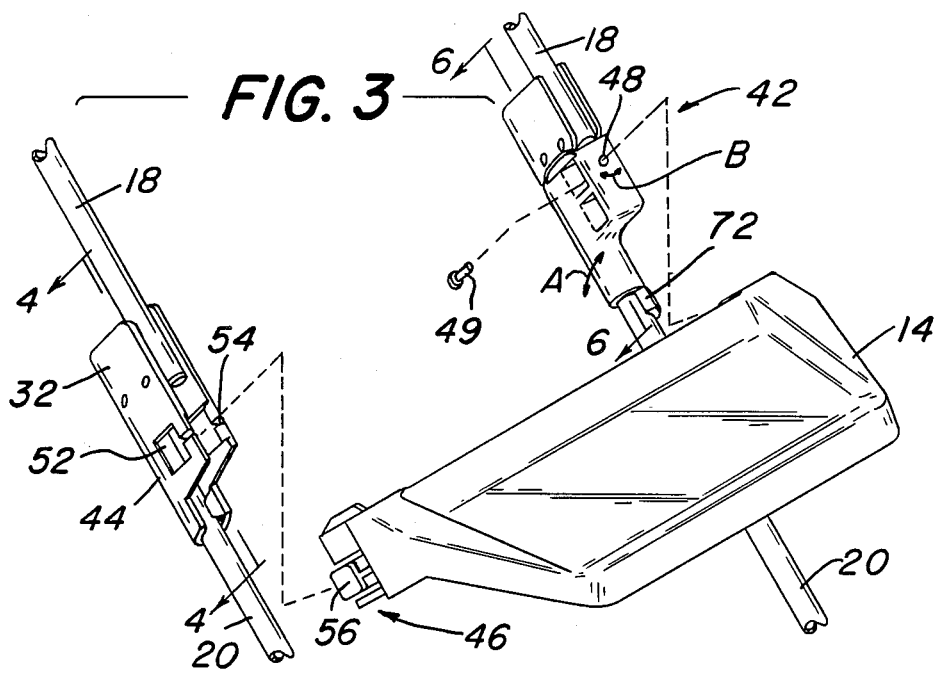
FIG. 3 is an isometric exploded view of the tray, tray swivel and tray latch mechanisms, parts being broken away for clarity.
Figure 4:
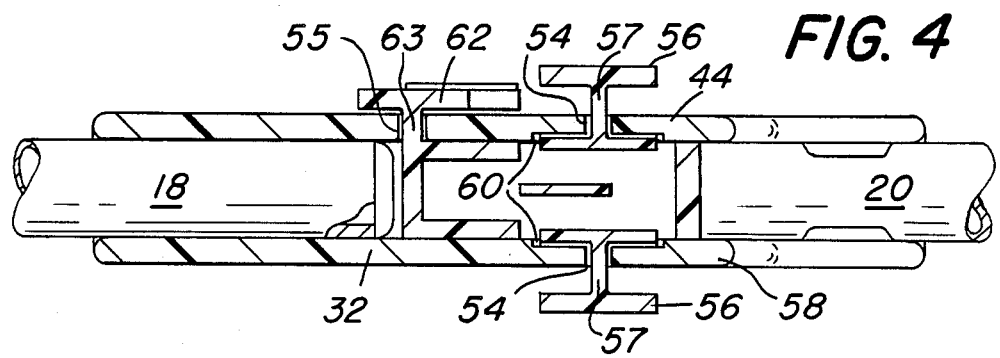
FIG. 4 is a sectional view of the tray latch mechanism taken along lines 4—4 of FIG. 3.
Figure 6:
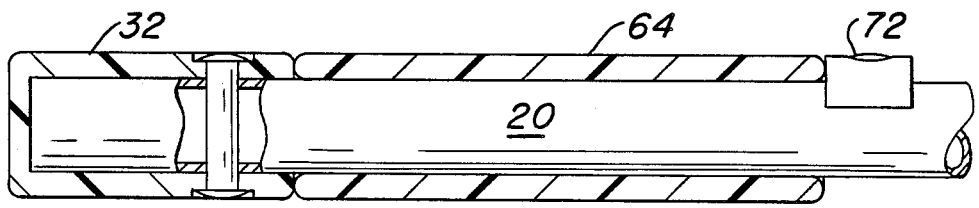
FIG. 6 is a sectional view of the tray swivel mechanism taken along line 6—6 of FIG. 3.

The tray catch 44 and tray latch 46 mechanisms are illustrated in FIGS. 3, 4 and 5. The tray latch 46 is disposed at the end of tray 14 opposite the swivel 42. Latch 46 is adapted for engagement with catch 44. Catch 44 is preferably integrally molded with hinge 32. Catch 44 is associated with the upper end portion of lower member 20.

Catch 44 is generally U-shaped in cross-section. Each leg portion of the U-shaped catch 44 includes a generally rectangular slot 52. A slot 54 is cut through each leg of U-shaped catch 44 and extends from the free edge portion of catch 44 to slot 52.

Latch 46 includes a pair of finger surfaces 56 and grip surfaces 60. Grip surfaces 60 are for engagement with the peripheral edge portions of slot 52. A web 57 joins finger surface 56 and grip surface 60. Web 57 is adapted to slide through slot 54 and acts as a guide to properly position the latch 46 in catch 44.

Grip surface 60, web 57 and finger surface 56 are preferably integral with a spring arm 78. When finger surfaces 56 are pressed toward one another, spring arms 78 can bend to the phantom position shown in FIG. 5. At the phantom position, grip surfaces 60 disengage from the peripheral edge portion of slot 52. Thereby, the latch 46 can be moved out of engagement with catch 44. The latch 46 and catch 44 combine to form a very secured lock to prevent tray 14 from accidentally being opened. Furthermore, because of the pair of spring arms and grip surfaces, the latch 46 and catch 44 cannot be opened accidentally by pushing a single finger surface 56. Accordingly, the latch 46 and catch 44 are a safety mechanism.

A guide blade 58 is provided for guiding latch 46 into catch 44. Blade 58 has a width such that its lateral edge portions engage the side legs of the generally U-shaped catch member 44.

A second guide member 62 is provided on the side opposite said grip surface 60. Guide member 62 also is provided with a web 63 which is adapted for sliding engagement within a slot 55.

A stop blade 74 is provided between grip surfaces 60 and spring arms 78. Stop blade 74 is to prevent over stress of spring arms 78 and to limit the arms 78 inward movement.

Figure 7:
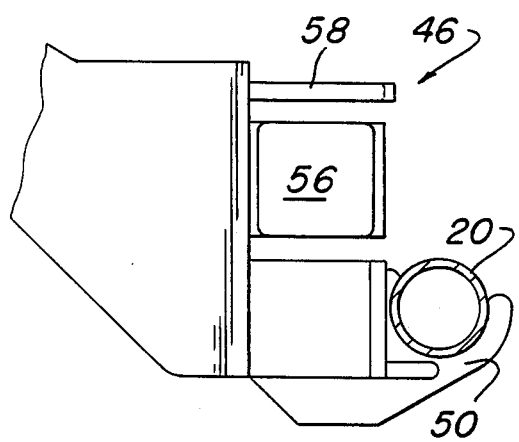
FIG. 7 is an elevational view of a tray clasp mechanism.

Referring to FIG. 7, there is shown a preferred tray member clasp 50. Clasp member 50 is adapted for frictional engagement with lower member 20. Clasp member 50 is used to secure the tray in its "stowed" position.

Clasp member 50 is important because it prevents the tray 14 from striking the ground when stowed and secures the tray out of harms way.

The present invention may be embodied in other specific forms without departing from the spirit or essential attributes thereof and, accordingly, reference should be made to the appended claims, rather than the foregoing specification, as indicating the scope of the invention.

We claim:

1. A stroller comprises:
 stroller means for collapsing and folding to a compact shape;
 tray means operatively associated with said stroller means and including a tray portion, swivel means located at one end of said tray portion and latching means located at an opposite end of said tray portion, said swivel means including a sleeve which engages a member of said stroller means and allows the sleeve to rotate about said member and pivot means affixed to said tray portion and being perpendicular to said member of said stroller means, said tray portion engages said pivot means for rotation about said pivot means, said latching means includes a latch portion and a catch portion, said latch portion includes a pair of grip surfaces, each said grip surface being affixed to a spring arm, said catch portion being affixed to a member of said stroller means, said catch portion being generally U-shaped in cross-section and having a semi-circular base and upstanding leg portions and having slot means provided for each said leg portion, said slot means providing a surface upon which said grip surface may engage and providing a means for guiding said latch portion into said catch portion whereby said pair of grip surfaces engage said slot means, and said tray means is locked in place.

2. A stroller according to claim 1 wherein said latch portion includes a finger surface associated with each grip surface.

3. A stroller according to claim 2 wherein said finger surface and said grip surface being interconnected by a web, said web adapted to interact with said slot means to guide said latch portion into said catch portion.

4. A stroller according to claim 1 wherein said slot means includes a generally rectangular slot and a slot through each leg of said U-shaped catch that extends from the free edge portion of said catch portion to said rectangular slot.

5. A stroller according to claim 1 wherein said latch portion includes guide means adapted for guiding said latch portion into said catch portion.

* * * * *